2,766,252
ESTERS OF NICOTINIC ACID

Albert Schlesinger, Jackson Heights, N. Y., assignor to Endo Laboratories, Inc., Richmond Hill, N. Y., a corporation of New York No Drawing. Application January 24, 1955, Serial No. 483,838

5 Claims. (Cl. 260—295.5)

This invention relates to novel esters of pyridine-3-carboxylic acids, i. e., nicotinic acid. It is directed especially to the dibenzylamino-alkyl esters of pyridine-3-carboxylic acid and the acid addition salts thereof; and methods of preparing the same.

The novel esters of this invention have the following structure:

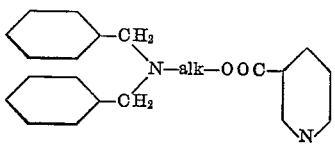

wherein "alk" designates a relatively low molecular weight alkylene radical.

The foregoing novel esters and the acid addition salts thereof are physiologically active, and exhibit particularly vaso-depressor action. The novel esters of this invention can be manufactured by the interaction of nicotinic acid, or nicotinic acid anhydride, nicotinic acid chloride, an ester of nicotinic acid or a salt of nicotinic acid, as for example, an alkaline metal nicotinate with dibenzylamino alkanols or dibenzylamino-alkyl chlorides.

The following are illustrative examples of the invention:

Example 1

A mixture of 12.8 grams of nicotinic acid and 24.1 grams of dibenzylamino ethanol in 100 cc. of xylene are heated to boiling so that the water formed during the interaction of the reactants distils off slowly. When 1.8 cc. of water has been collected in the receiver, the residual xylene is distilled under vacuum. The dibenzylamino-ethyl nicotinate, in the form of an oil, is transformed into the dihydrochloride salt thereof, which is crystallized from ethanol and ether. The melting point of the recrystallized salt is 181° C.

Example 2

To a suspension of 14.6 grams of sodium nicotinate in 200 cc. of absolute ethanol there are added 26 grams of dibenzylamino ethyl chloride. The mixture is heated for four hours on a water bath under a reflux condenser. Sodium chloride separates out slowly. On cooling the reaction mixture, the sodium chloride is removed by filtration, and the alcohol is distilled off. The residue, the dibenzylamino ethyl nicotinate, is dissolved in ethanol and dry hydrogen chloride is introduced into the ethanolic solution. Upon the addition of ether, the dihydrochloride salt crystallizes out. Its melting point is 181° C.

Example 3

12.5 grams of nicotinic acid chloride hydrochloride and 16.8 grams of dibenzylamino ethanol in 200 cc. of dry benzene are mixed. After standing for 24 hours at room temperature, the mixture is refluxed for four hours. Then the mixture is allowed to cool to room temperature and 200 cc. of hexane are added thereto. The dihydrochloride salt precipitates in crystalline form. It is recrystallized from ethanol and ether. The melting point thereof is 181° C.

Example 4

26.7 grams of nicotinic acid chloride hydrochloride and 40.3 grams of 2-methyl-2-dibenzylamino-1-propanol in 350 cc. of dry benzene are mixed. After standing for 24 hours at room temperature, the mixture is refluxed for four hours. Upon cooling to room temperature, 300 cc. of hexane are added to the cooled mixture. The dihydrochloride salt of the 2-methyl-2-dibenzylamino-1-propanol ester of nicotinic acid precipitates. This product is recrystallized from ethanol and acetone. Its melting point is 180° C.

The novel 2-methyl-2-dibenzylamino-1-propanol used for the synthesis of the novel ester of this example was prepared by benzylating 2-methyl-2-amino-1-propanol. Such benzylation was effectuated by reacting benzyl chloride with 2-methyl-2-amino-1-propanol in the presence of potassium carbonate. The boiling point of this benzyl-amino alkanol at 3–4 mm. (mercury gauge) is 190° C. The hydrochloride salt thereof has a melting point of 140° C.

Example 5

35.6 grams of nicotinic acid chloride hydrochloride and 51 grams of 1-dibenzylamino-2-propanol in 500 cc. of anhydrous benzene are mixed. After standing for 24 hours at room temperature, the mixture is refluxed for six hours. Upon cooling to room temperature, 300 cc. of hexane are added thereto. The dihydrochloride salt of the 1-dibenzylamino-2-propanol ester of nicotinic acid precipitates and is filtered off by a Buchner funnel. The salt is recrystallized from ethanol and ether. It has a melting point of 171° C.

The 1-dibenzylamino-2-propanol used in the preparation of the novel ester of this example was synthesized by benzylating 1-amino-2-propanol. This benzylation was effectuated by the interaction of benzyl chloride with the amino alkanol in the presence of potassium carbonate. The boiling point thereof at 7 mm. (mercury gauge) is 189° C.

It will be understood that the foregoing description of the invention and the examples set forth are merely illustrative of the principles thereof. Accordingly, the appended claims are to be construed as defining the invention within the full spirit and scope thereof.

I claim:

1. Compounds of the group consisting of pyridine-3-carboxylic acid esters of dibenzylamino alkanols having the structure:

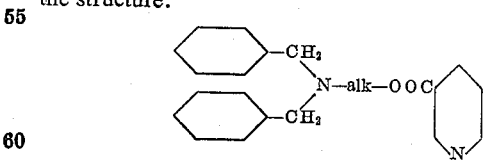

wherein "alk" designates a lower alkylene radical and the acid addition salts of said esters.

2. The dibenzylamino ethyl ester of pyridine-3-carboxylic acid.

3. The 2-dibenzylamino-2-methyl-1-propyl ester of pyridine-3-carboxylic acid.

4. The 1-dibenzylamino-2-propyl ester of pyridine-3-carboxylic acid.

5. The method of manufacturing dibenzylamino alkyl esters of pyridine-3-carboxylic acid which comprises interacting a compound selected from the group consisting of nicotinic acid, nicotinic acid anhydride, nicotinic acid chloride, lower alkyl esters of nicotinic acid and salts of nicotinic acid with a compound selected from the group consisting of dibenzylamino alkanols and dibenzylamino alkyl chlorides.

References Cited in the file of this patent

FOREIGN PATENTS 743,467   Germany _____ Jan. 14, 1944

OTHER REFERENCES

Knunyantz et al.: (Russia) 35,836, Chem. Abst., vol. 29, p. 8001 (1935).

Billman et al.: JACS, vol. 66, pp. 745-6 (1944).